(12) United States Patent
Kasajima et al.

(10) Patent No.: US 7,015,689 B2
(45) Date of Patent: Mar. 21, 2006

(54) CONNECTION METHOD FOR PROBE PINS FOR MEASUREMENT OF CHARACTERISTICS OF THIN-FILM MAGNETIC HEAD AND CHARACTERISTIC MEASUREMENT METHOD FOR THIN-FILM MAGNETIC HEAD

(75) Inventors: Tamon Kasajima, Kwai Chung (HK); Masashi Shiraishi, Kwai Chung (HK)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 155 days.

(21) Appl. No.: 10/735,625

(22) Filed: Dec. 16, 2003

(65) Prior Publication Data

US 2004/0130321 A1     Jul. 8, 2004

(30) Foreign Application Priority Data

Dec. 19, 2002   (JP)   ............................... 2002/367743

(51) Int. Cl.
  *G01R 33/12* (2006.01)
(52) U.S. Cl. ...................................... 324/210; 324/212
(58) Field of Classification Search ................ 324/210, 324/212, 262
  See application file for complete search history.

(56) References Cited

U.S. PATENT DOCUMENTS

| | | | | |
|---|---|---|---|---|
| 5,639,266 A | * | 6/1997 | Patel | ........................... 439/676 |
| 6,433,540 B1 | * | 8/2002 | Hachisuka et al. | .......... 324/210 |
| 6,479,988 B1 | * | 11/2002 | Hachisuka et al. | .......... 324/210 |
| 6,483,298 B1 | * | 11/2002 | Heim et al. | .................. 324/210 |
| 6,573,711 B1 | * | 6/2003 | Schaenzer et al. | ........... 324/210 |

* cited by examiner

*Primary Examiner*—Michael Tokar
(74) *Attorney, Agent, or Firm*—Buchanan Ingersoll PC

(57) ABSTRACT

A method of connecting a plurality of probe pins to a plurality of first external connection pads, which are provided on a head gimbal assembly and are electrically connected to a plurality of terminal electrodes of a write magnetic head element, respectively, and a plurality of second external connection pads, which are provided on the head gimbal assembly and are electrically connected to a plurality of terminal electrodes of a read magnetic head element. In the connection method, an approach direction of the probe pins to the first external connection pads and an approach direction of the probe pins to the second external connection pads are made different from each other.

8 Claims, 13 Drawing Sheets

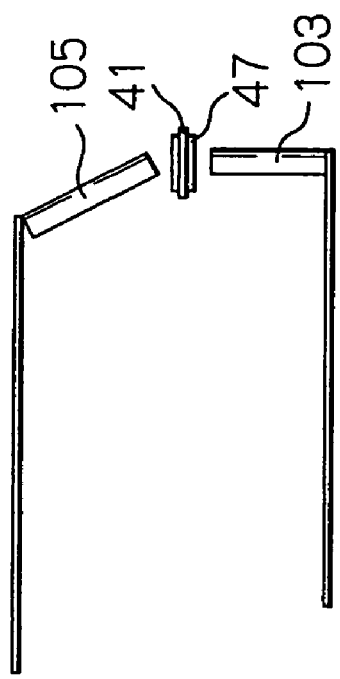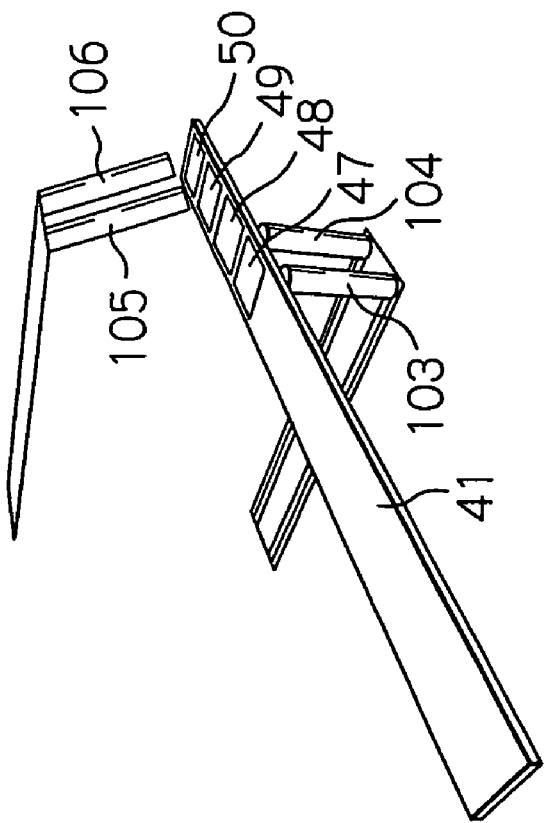

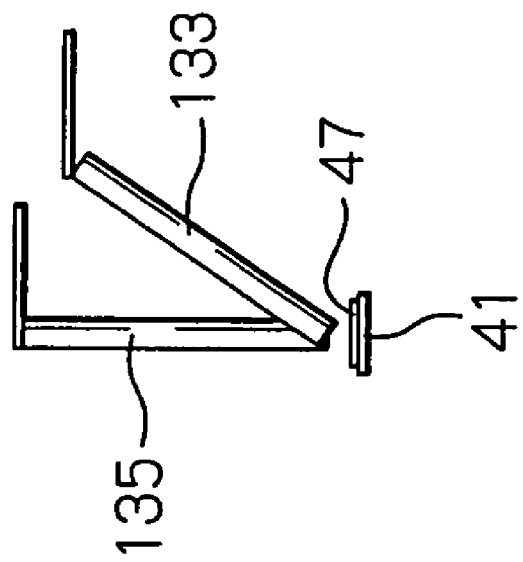
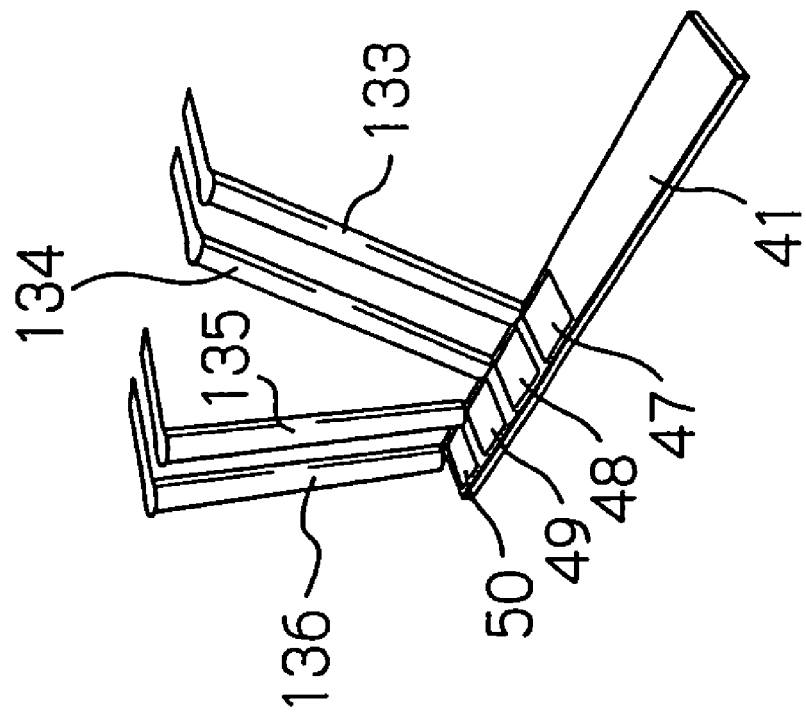

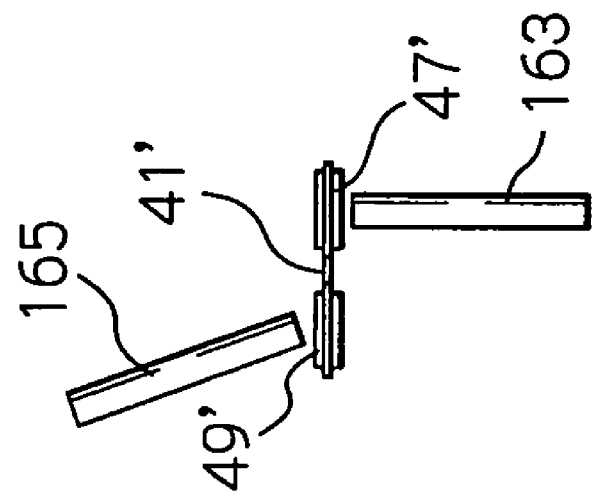
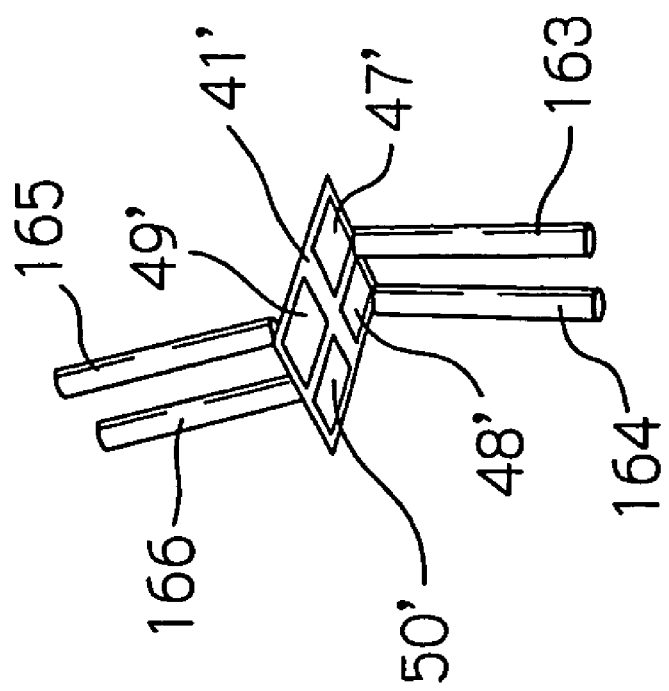
Fig. 16a
Fig. 16b

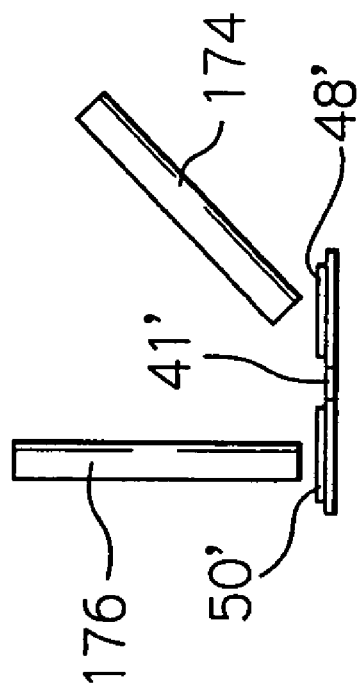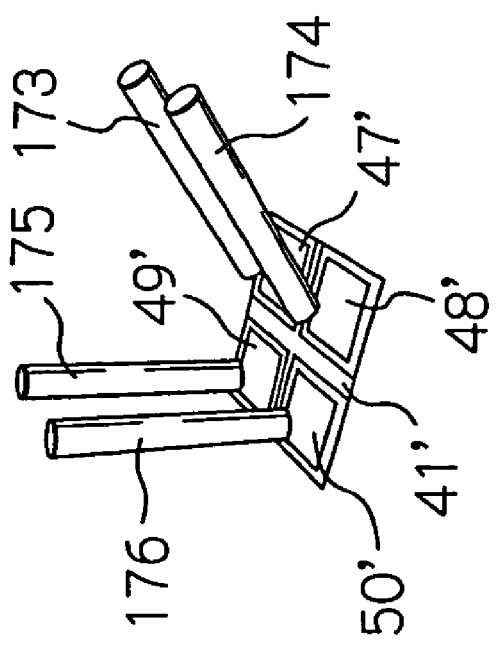

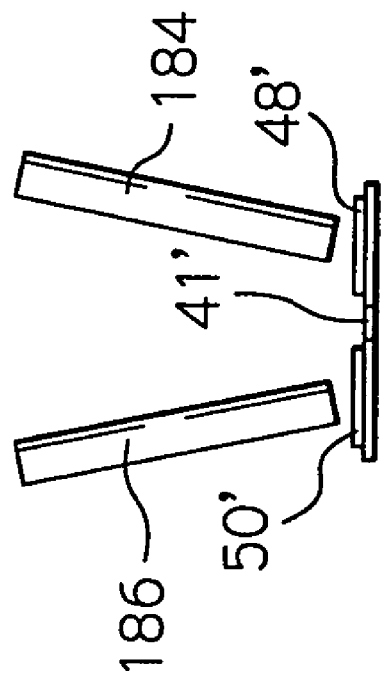
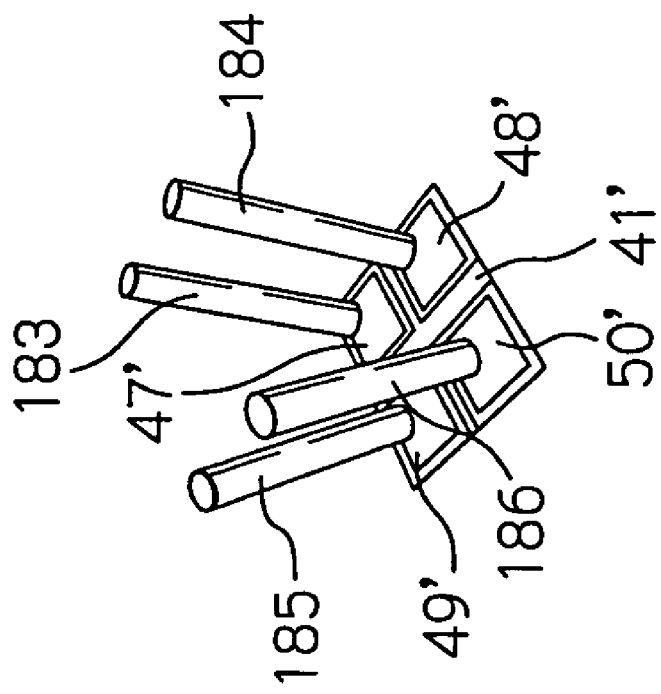

CONNECTION METHOD FOR PROBE PINS FOR MEASUREMENT OF CHARACTERISTICS OF THIN-FILM MAGNETIC HEAD AND CHARACTERISTIC MEASUREMENT METHOD FOR THIN-FILM MAGNETIC HEAD

BACKGROUND OF THE INVENTION

1. Field of the Invention

The present invention relates to a connection method for probe pins for measurement of characteristics of a thin-film magnetic head and a characteristic measurement method for the thin-film magnetic head.

2. Description of the Related Art

A head gimbal assembly (HGA) constituted by mounting a magnetic head slider on a suspension is usually provided with external connection pads which are electrically connected to a thin-film magnetic head formed on the magnetic head slider.

In the case in which dynamic characteristics of the thin-film magnetic head on the HGA are evaluated, probe pins are brought into contact with the external connection pads to apply a write current to a write magnetic head element and take out a read signal from a read magnetic head element. An IC for head drive, which generates the write current or amplifies the read signal, is connected to the probe pins. Characteristic evaluation of a plurality of HGAs is performed using one IC for head drive in common in this way, whereby it becomes possible to evaluate characteristics of each HGA itself.

At the time of the characteristic evaluation, usually, four probe pins, namely, two probe pins for the write magnetic head element and two probe pins for the read magnetic head element, are connected to four external connection pad.

FIGS. 1 to 3 are perspective views showing conventional examples of a form of connecting probe pins and external connection pads. In these figures, reference numerals 10 and 11, 20 and 21, as well as 30 and 31 denote probe pins for a write magnetic head element; 12 and 13, 22 and 23, as well as 32 and 33 denote probe pins for a read magnetic head element; and 14 to 17, 24 to 27, and 34 to 37 denote external connection pads to which these probe pins 10 to 13, 20 to 23, and 30 to 33 are connected in contact with each other.

As it is evident from these figures, in the related art, the four probe pins 10 to 13, 20 to 23, and 30 to 33 are connected to the external connection pads 14 to 17, 24 to 27, and 34 to 37 in a state in which the probe pins are arranged in parallel with each other.

However, if the probe pins are connected to the external connection pads in a state in which the probe pins are arranged in parallel with each other to perform the characteristic evaluation as in the related art, an extremely large cross talk voltage is applied to the read magnetic head element by a write current flown through the probe pins 10 and 11, 20 and 21, as well as 30 and 31.

In particular, since a recent read magnetic head element has a giant magnetoresistive effect (GMR) laminated structure or a tunnel magnetoresistive effect (TMR) laminated structure, a resistance against an applied voltage is low. When such a large cross talk voltage is applied to the element, it is likely that destruction of the element occurs as in an ESD. Even if this does not lead to complete destruction, it is likely that a resistance change of 1 Ω or less occurs to cause drop or instability of an output voltage.

BRIEF SUMMARY OF THE INVENTION

It is therefore an object of the present invention to provide a connection method for probe pins for measurement of characteristics of a thin-film magnetic head, which can reduce a cross talk voltage applied to a read magnetic head element when electric characteristics are measured, and a characteristic measurement method for the thin-film magnetic head.

According to the present invention, a plurality of probe pins for measurement of characteristics of a thin-film magnetic head, are connected to a plurality of first external connection pads, which are provided on an HGA and are electrically connected to a plurality of terminal electrodes of a read magnetic head element, respectively, and to a plurality of second external connection pads, which are provided on the HGA and are electrically connected to a plurality of terminal electrodes of a write magnetic head element. An approach direction of the probe pins to the first external connection pads and an approach direction of the probe pins to the second external connection pads are made different from each other. A method of measuring characteristics of the thin-film magnetic head performs characteristic measurement for the write magnetic head element and/or the read magnetic head according to this connection method.

Since the approach direction of the probe pins, which are connected to the first external connection pads for the write head element, and the approach direction of the probe pins, which are connected to the second external connection pads for the read head element, are different from each other, a cross talk voltage to the read head element side caused by a write current at the time of characteristic evaluation extremely decreases, and destruction of the read magnetic head element, and drop and fluctuation of an output voltage can be suppressed as much as possible. Moreover, it is unnecessary to change a design of the tin-film magnetic head for this purpose.

It is preferable that the approach directions are different from each other by 90° or 180°.

It is also preferable that the approach directions are different from each other by a predetermined angle, which is larger than 90° and smaller than 180°, or a predetermined angle, which is smaller than 90°.

It is also preferable to connect the probe pins to the first and the second external connection pads, which exist on an identical surface of the HGA, or to the first and the second external connection pads, which exist on different surfaces of the HGA, respectively.

It is also preferable that the probe pins are four probe pins which are connected to two of the first external connection pads and two of the second external connection pads, respectively.

Further objects and advantages of the present invention will be apparent from the following description of the preferred embodiments of the invention as illustrated in the accompanying drawings.

BRIEF DESCRIPTION OF THE DRAWINGS

FIG. 10a is a perspective view for explaining a method of connecting probes and external connection pads in yet another embodiment of the present invention;

FIG. 10b is a side view for explaining the method of connecting probes and external connection pads in the embodiment of the present invention;

FIG. 13a is a perspective view for explaining a method of connecting probes and external connection pads in yet another embodiment of the present invention;

FIG. 13b is a side view for explaining the method of connecting probes and external connection pads in the embodiment of the present invention;

FIG. 16a is a perspective view for explaining a method of connecting probes and external connection pads in yet another embodiment of the present invention;

FIG. 16b is a side view for explaining the method of connecting probes and external connection pads in the embodiment of the present invention;

FIG. 17a is a perspective view for explaining a method of connecting probes and external connection pads in yet another embodiment of the present invention;

FIG. 17b is a side view for explaining the method of connecting probes and external connection pads in the embodiment of the present invention;

FIG. 18a is a perspective view for explaining a method of connecting probes and external connection pads in yet another embodiment of the present invention; and FIG. 18b is a side view for explaining the method of connecting probes and external connection pads in the embodiment of the present invention.

DETAILED DESCRIPTION OF THE INVENTION

Figure 1:
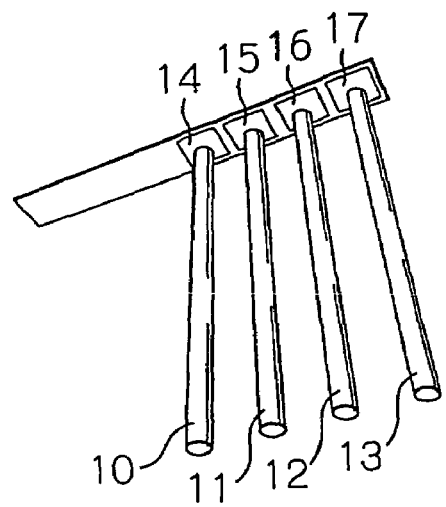
FIG. 1 is a perspective view showing a conventional example of a form of connecting probe pins and external connection pads.
Figure 2:
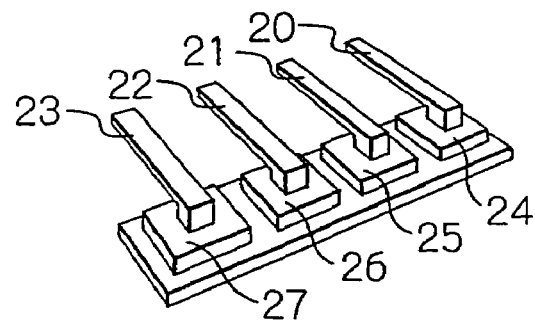
FIG. 2 is a perspective view showing a conventional example of a form of connecting probe pins and external connection pads.
Figure 3:
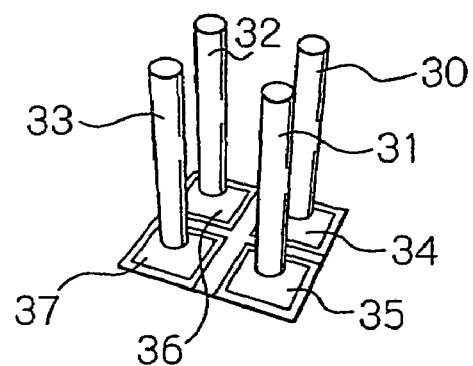
FIG. 3 is a perspective view showing a conventional example of a form of connecting probe pins and external connection pads.
Figure 4:
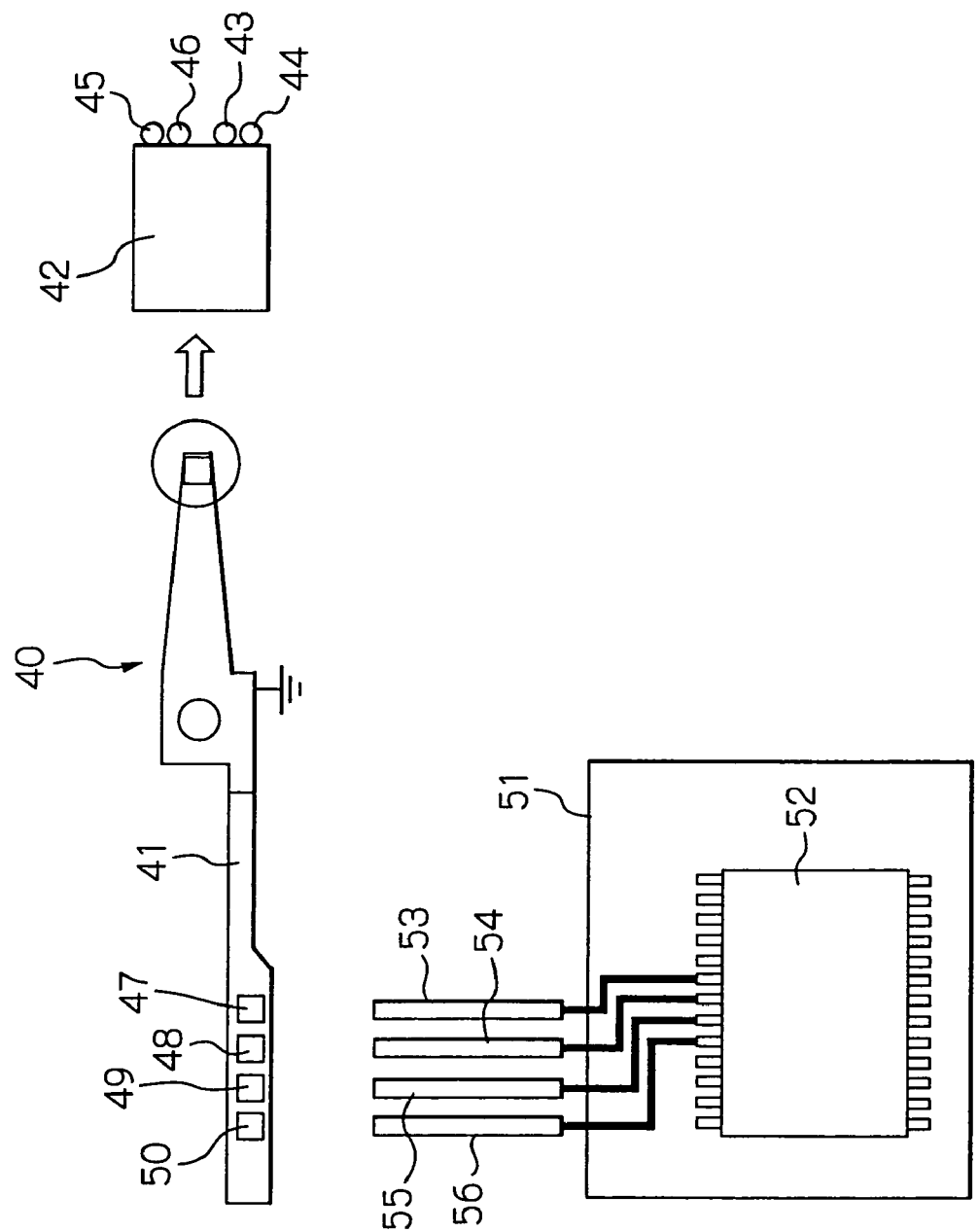
FIG. 4 is a plan view showing, as an embodiment of a connection method and a measurement method of the present invention, an HGA and a part of a dynamic characteristic measurement device connected to the HGA.
Figure 5:
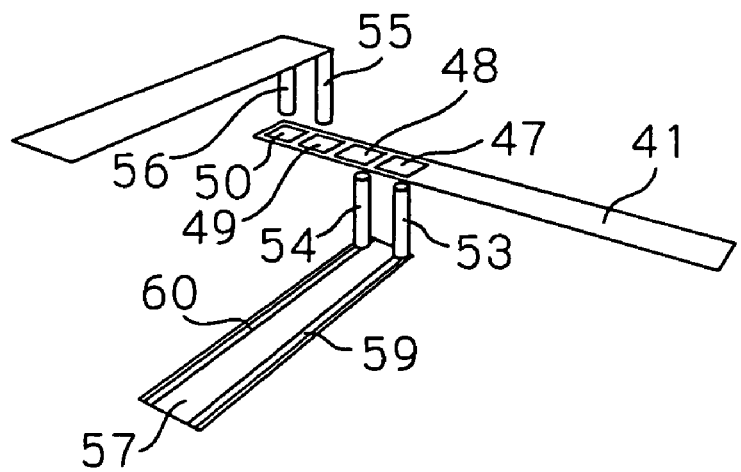
FIG. 5 is a perspective view for explaining a method of connecting probes and external connection pads in the embodiment shown in FIG. 4.

FIG. 4 is a plan view showing, as an embodiment of a connection method and a measurement method of the present invention, an HGA and a part of a dynamic characteristic measurement device connected to the HGA. FIG. 5 is a perspective view for explaining a method of connecting probes and external connection pads in the embodiment shown in FIG. 4.

As shown in FIG. 4, the HGA is constituted by mounting a magnetic head slider 42, which is provided with a write magnetic head element and a read magnetic head element, at a tip portion of a suspension 40, which is provided with a wiring member 41 formed of an FPCB (flexible print circuit board) or the like.

Two terminal electrodes 43 and 44 of the write magnetic head element and two terminal electrodes 45 and 46 of the read magnetic head element are electrically connected to external connection pads 47 to 50, which are formed on the wiring member 41 in a rear part of the suspension 40, via a not-shown trace conductor formed on the wiring member 41. In this embodiment, the external connection pads 47 to 50 are formed on both the rear surface and the front surface of the wiring member 41.

The dynamic characteristic measurement device is constituted by, for example, a publicly known DP (dynamic performance) tester (read-write tester). An IC 52 for head drive and signal amplification is provided in an input/output section 51 thereof for the magnetic head element. Four probe pins 53 to 56 are connected to this IC 52.

As shown in FIG. 5, the probe pins 53 and 54 and the probe pins 55 and 56 are adhered to tip portions of PCBs (print circuit boards) 57 and 58. Trace conductors 59 and 60, which electrically connect the probe pins 53 and 54 and the IC 52, are formed on the PCB 57. The same trace conductor is formed on the PCB 58.

In measuring dynamic characteristics, an HGA to be measured is attached to the DP tester, and the probe pins are electrically connected to the external connection pads thereof. In this embodiment, as shown in FIG. 5, the probe pins 53 and 54 and the probe pins 55 and 56 are arranged on both sides of the wiring member 41 and are opposed to each other at an angle of 180° to be connected to the external connection pads 47 and 48 and the external connection pads 49 and 50, respectively. In other words, the probe pins 53 and 54 approach the external connection pads 47 and 48 from a direction perpendicular to a rear surface of the wiring member 41 of the HGA on a rear side thereof and come into contact with the external connection pads 47 and 48, respectively, to be electrically connected thereto, and the probe pins 55 and 56 approach the external connection pads 49 and 50 from a direction perpendicular to a front surface of the wiring member 41 on a front side thereof and come into contact with the external connection pads 49 and 50, respectively, to be electrically connected thereto. Note that, in FIG. 5, these probe pins and external connection pads are shown in a state in which they are not actually in contact with each other in order to facilitate explanation about approach directions of the probe pins with respect to the external connection pads.

As described above, in this embodiment, the probe pins 53 and 54, which are connected to the write magnetic head element, and the probe pins 55 and 56, which are connected to the read magnetic head element, approach the external connection pads 47 and 48 and the external connection pads 49 and 50, respectively, from the directions 180° apart from each other.

In general, cross talk between a write side and a read side in dynamic characteristic measurement of an HGA occurs in (1) an ID itself for head drive and signal amplification, (2) trace conductors on PCBs mounted with the IC for head drive and signal amplification, (3) probe pins, and (4) a wiring member of the HGA. The inventor found that a percentage of cross talk which occurs in the probe pins (3) was very large. Thus, as in this embodiment, the cross talk could be reduced remarkably by connecting the probe pins 53 and 54 on the write side and the probe pins 55 and 56 on the read side at the approach angles 180° apart from each other. Note that, as in this embodiment, the PCBs 57 and 58 are provided independently to be separated from each other, whereby a wide space can be secured between the trace conductors on PCBs of (2) above. Thus, the cross talk can be further reduced from this point as well.

Figure 6:
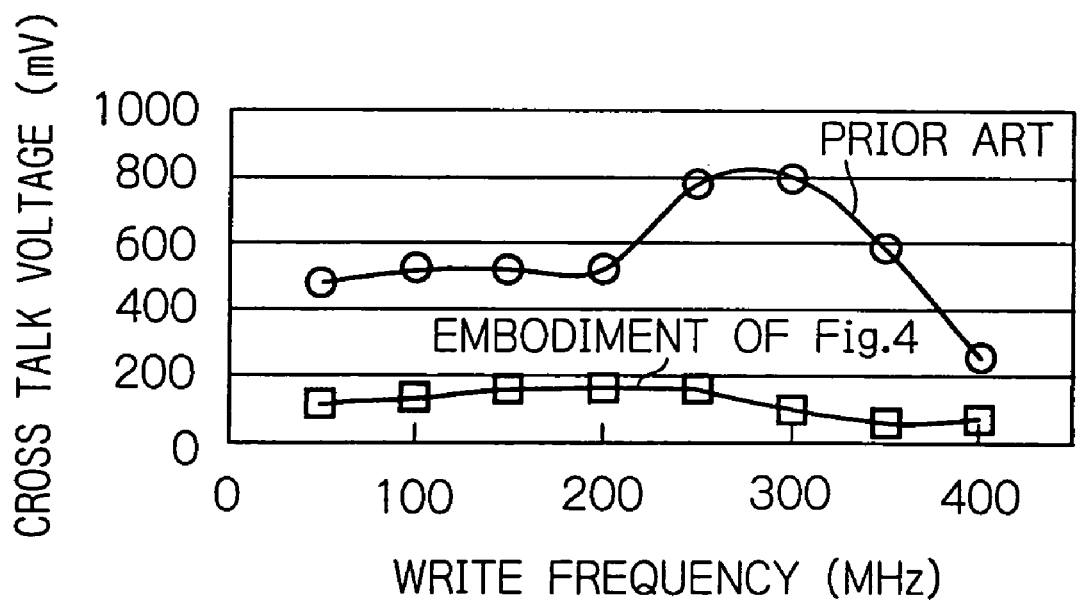
FIG. 6 is a characteristic diagram showing a write frequency-cross talk voltage characteristic in the case in which an arrangement of probe pins is changed.

FIG. 6 is a characteristic diagram showing a write frequency-cross talk voltage characteristic in the case in which an arrangement of probe pins are changed. FIG. 6 shows the connection method for probe pins according to this embodiment and the connection method according to the related art in comparison. Actually, a resistor of 50Ω is connected between terminal electrodes for a read magnetic head element on the HGA to measure changes in voltage at both ends thereof with differential voltage probes. The changes in voltage are measured using the same HGA, IC, and probe pins and changing only approach directions of the probe pins.

As it is evident from the figure, whereas a cross talk voltage is 400 mV or more in almost all write frequencies in the connection method according to the related art, the cross talk voltage decreases to 200 mV or less in this embodiment.

Figure 7:
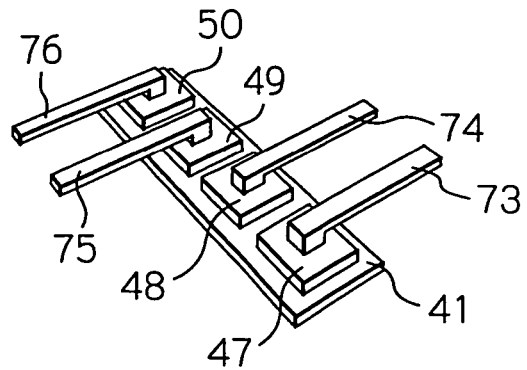
FIG. 7 is a perspective view for explaining a method of connecting probes and external connection pads in another embodiment.

FIG. 7 is a perspective view for explaining a method of connecting probes and external connection pads in another embodiment of the connection method of the present invention. Note that constitutions of an HGA and a dynamic characteristic measurement device connected thereto in this embodiment are the same as those in the embodiment shown in FIG. 4. Therefore, in FIG. 7, the same components as those in FIGS. 4 and 5 are denoted by the identical reference numerals.

In this embodiment, probe pins 73 and 74 and probe pins 75 and 76 are arranged on the same side of the wiring member 41 and are opposed to each other at an angle of 180° to be connected to the external connection pads 47 and 48 and the external connection pads 49 and 50, respectively. In other words, the probe pins 73 and 74 approach the external connection pads 47 and 48 in parallel with the front surface of the wiring member 41 of the HGA and come into contact with the external connection pads 47 and 48, respectively, to be electrically connected thereto, and the probe pins 75 and 76 approach the external connection pads 49 and 50, although in parallel with the front surface of the wiring member 41 as well, from an opposite direction 180° apart from the direction of the probe pins 73 and 74 and come into contact with the external connection pads 49 and 50, respectively, to be electrically connected thereto.

As described above, in this embodiment, the probe pins 73 and 74, which are connected to the write magnetic head element, and the probe pins 75 and 76, which are connected to the read magnetic head element, approach the external connection pads 47 and 48 and the external connection pads 49 and 50, respectively, from the directions 180° apart from each other. In this way, the probe pins 73 and 74 on the write side and the probe pins 75 and 76 on the read side are connected to the external connection pads 47 and 48 and the external connection pads 49 and 50, respectively, at the approach angles 180° apart from each other, whereby cross talk can be reduced remarkably. Other components, operational effects, and the like in this embodiment are substantially the same as those in the embodiment shown in FIG. 4.

Figure 8:
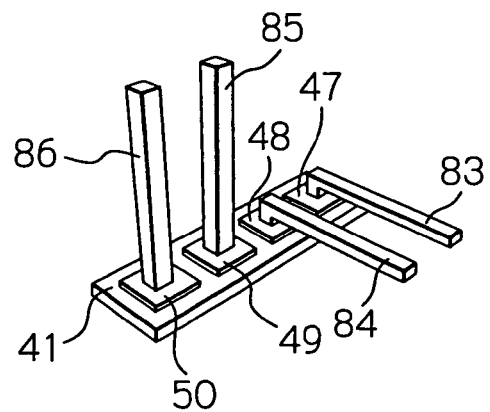
FIG. 8 is a perspective view for explaining a method of connecting probes and external connection pads in still another embodiment of the present invention.

FIG. 8 is a perspective view for explaining a method of connecting probes and external connection pads in still another embodiment of the connection method of the present invention. Note that constitutions of an HGA and a dynamic characteristic measurement device connected thereto in this embodiment are the same as those in the embodiment shown in FIG. 4. Therefore, in FIG. 8, the same components as those in FIGS. 4 and 5 are denoted by the identical reference numerals.

In this embodiment, probe pins 83 and 84 and probe pins 85 and 86 are arranged on the same side of the wiring member 41 and connected to the external connection pads 47 and 48 and the external connection pads 49 and 50, respectively, an angle of 90° apart from each other. In other words, the probe pins 83 and 84 approach the external connection pads 47 and 48 in parallel with the front surface of the wiring member 41 of the HGA and come into contact with the external connection pads 47 and 48, respectively, to be electrically connected thereto, and the probe pins 85 and 86 approach the external connection pads 49 and 50 from a direction perpendicular to the front surface of the wiring member 41 and come into contact with the external connection pads 49 and 50, respectively, to be electrically connected thereto.

As described above, in this embodiment, the probe pins 83 and 84, which are connected to the write magnetic head element, and the probe pins 85 and 86, which are connected to the read magnetic head element, approach the external connection pads 47 and 48 and the external connection pads 49 and 50, respectively, from the directions 90° apart from each other. In this way, the probe pins 83 and 84 on the write side and the probe pins 85 and 86 on the read side are connected to the external connection pads 47 and 48 and the external connection pads 49 and 50, respectively, at the approach angles 90° apart from each other, whereby cross talk can be reduced remarkably. Other components, operational effects, and the like in this embodiment are substantially the same as those in the embodiment shown in FIG. 4.

Figure 9:
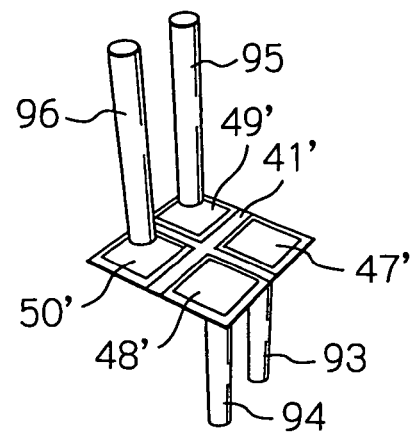
FIG. 9 is a perspective view for explaining a method of connecting probes and external connection pads in yet another embodiment of the present invention.

FIG. 9 is a perspective view for explaining a method of connecting probes and external connection pads in yet another embodiment of the connection method of the present invention. Note that constitutions of an HGA and a dynamic characteristic measurement device connected thereto in this embodiment are the same as those in the embodiment shown in FIG. 4. Therefore, in FIG. 9, the same components as those in FIGS. 4 and 5 are denoted by the identical reference numerals. Note that, in this embodiment, a shape of a wiring member 41' and an arrangement of external connection pads 47', 48', 49', and 50' formed on the wiring member 41' are different from those in the embodiments described above.

In this embodiment, probe pins 93 and 94 and probe pins 95 and 96 are arranged on both sides of the wiring member 41' and are opposed to each other at an angle of 180° to be connected to the external connection pads 47 and 48 and the external connection pads 49 and 50, respectively. In other words, the probe pins 93 and 94 approach the external connection pads 47' and 48' from a direction perpendicular to a rear surface of the wiring member 41' of the HGA on a rear side thereof and come into contact with the external connection pads 47' and 48', respectively, to be electrically connected thereto, and the probe pins 95 and 96 approach the external connection pads 49' and 50' from a direction perpendicular to a front surface of the wiring member 41' on a front side thereof and come into contact with the external connection pads 49' and 50', respectively, to be electrically connected thereto. Note that, in FIG. 9, these probe pins and external connection pads are shown in a state in which they are not actually in contact with each other in order to facilitate explanation about approach directions of the probe pins with respect to the external connection pads.

As described above, in this embodiment, the probe pins 93 and 94, which are connected to the write magnetic head element, and the probe pins 95 and 96, which are connected to the read magnetic head element, approach the external connection pads 47' and 48' and the external connection pads 49' and 50', respectively, from the directions 180° apart from each other. In this way, the probe pins 93 and 94 on the write side and the probe pins 95 and 96 on the read side are connected to the external connection pads 47' and 48' and the external connection pads 49' and 50', respectively, at the approach angles 180° apart from each other, whereby cross talk can be reduced remarkably. Other components, operational effects, and the like in this embodiment are substantially the same as those in the embodiment shown in FIG. 4.

FIGS. 10*a* and 10*b* show a perspective view and a side view for explaining a method of connecting probes and external connection pads in yet another embodiment of the connection method of the present invention, respectively. Note that constitutions of an HGA and a dynamic characteristic measurement device connected thereto in this embodiment are the same as those in the embodiment shown in FIG. 4. Therefore, in FIGS. 10*a* and 10*b*, the same components as those in FIGS. 4 and 5 are denoted by the identical reference numerals.

In this embodiment, probe pins 103 and 104 and probe pins 105 and 106 are arranged on both sides of the wiring member 41 and are opposed to each other at a predetermined angle smaller than 180° to be connected to the external connection pads 47 and 48 and the external connection pads 49 and 50, respectively. In other words, the probe pins 103 and 104 approach the external connection pads 47 and 48 from a direction perpendicular to the rear surface of the wiring member 41 of the HGA on the rear side thereof and come into contact with the external connection pads 47 and 48, respectively, to be electrically connected thereto, and the probe pins 105 and 106 approach the external connection pads 49 and 50 from a direction of a predetermined angle smaller than 900 with respect to the front surface of the wiring member 41 on the front side thereof and come into contact with the external connection pads 49 and 50, respectively, to be electrically connected thereto. Note that, in FIGS. 10*a* and 10*b*, these probe pins and external connection pads are shown in a state in which they are not actually in contact with each other in order to facilitate explanation about approach directions of the probe pins with respect to the external connection pads.

As described above, in this embodiment, the probe pins 103 and 104, which are connected to the write magnetic head element, and the probe pins 105 and 106, which are connected to the read magnetic head element, approach the external connection pads 47 and 48 and the external connection pads 49 and 50, respectively, from the directions of the predetermined angle smaller than 180° apart from each other. In this way, the probe pins 103 and 104 on the write side and the probe pins 105 and 106 on the read side are connected to the external connection pads 47 and 48 and the external connection pads 49 and 50, respectively, at the approach angles of the predetermined angle smaller than 180° apart from each other, whereby cross talk can be reduced remarkably. Other components, operational effects, and the like in this embodiment are substantially the same as those in the embodiment shown in FIG. 4.

Figure 11B:
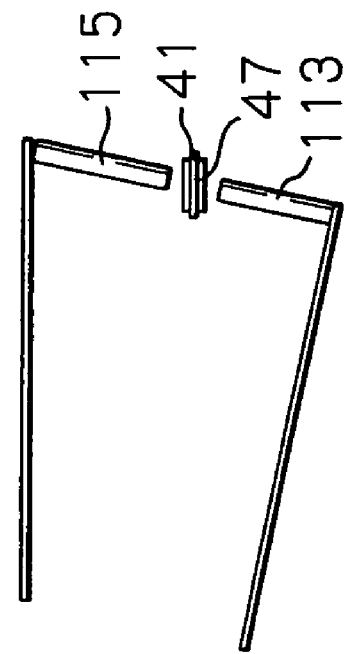
FIG. 11b is a side view for explaining the method of connecting probes and external connection pads in the embodiment.
Figure 11A:
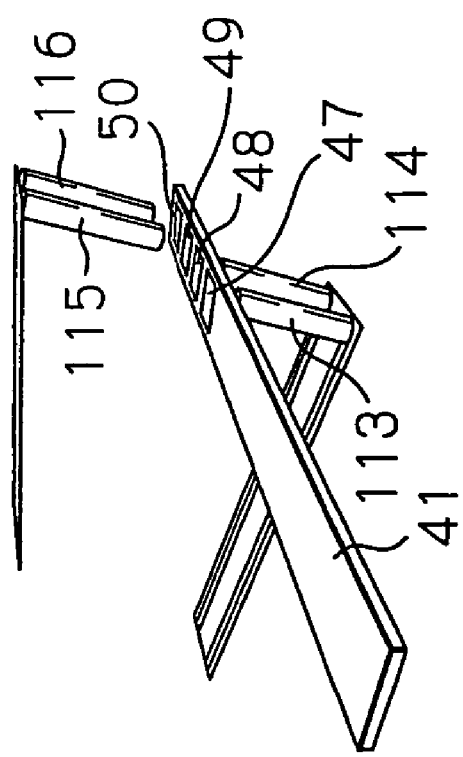
FIG. 11a is a perspective view for explaining a method of connecting probes and external connection pads in yet another embodiment of the present invention.

FIGS. 11*a* and 11*b* show a perspective view and a side view for explaining a method of connecting probes and external connection pads in yet another embodiment of the connection method of the present invention, respectively. Note that constitutions of an HGA and a dynamic characteristic measurement device connected thereto in this embodiment are the same as those in the embodiment shown in FIG. 4. Therefore, in FIGS. 11*a* and 11*b*, the same components as those in FIGS. 4 and 5 are denoted by the identical reference numerals.

In this embodiment, probe pins 113 and 114 and probe pins 115 and 116 are arranged on both sides of the wiring member 41 and are opposed to each other at an angle of 180° to be connected to the external connection pads 47 and 48 and the external connection pads 49 and 50, respectively. However, the directions of the probe pins are not directions perpendicular to the front surface of the wiring member 41 but slightly inclined directions. In other words, the probe pins 113 and 114 approach the external connection pads 47 and 48 from a direction of a predetermined angle slightly smaller than 90° with respect to the rear surface of the wiring member 41 of the HGA on the rear side thereof and come into contact with the external connection pads 47 and 48, respectively, to be electrically connected thereto, and the probe pins 115 and 116 approach the external connection pads 49 and 50 from a direction of a predetermined angle slightly smaller than 90° with respect to the front surface of the wiring member 41 on the front side thereof, which is a direction 180° apart from the direction of the probe pins 113 and 114, and come into contact with the external connection pads 49 and 50, respectively, to be electrically connected thereto. Note that, in FIGS. 11*a* and 11*b*, these probe pins and external connection pads are shown in a state in which they are not actually in contact with each other in order to facilitate explanation about approach directions of the probe pins with respect to the external connection pads.

As described above, in this embodiment, the probe pins 113 and 114, which are connected to the write magnetic head element, and the probe pins 115 and 116, which are connected to the read magnetic head element, approach the external connection pads 47 and 48 and the external connection pads 49 and 50, respectively, from the directions 180° apart from each other. In this way, the probe pins 113 and 114 on the write side and the probe pins 115 and 116 on the read side are connected to the external connection pads 47 and 48 and the external connection pads 49 and 50, respectively, at the approach angles 180° apart from each other, whereby cross talk can be reduced remarkably. Other components, operational effects, and the like in this embodiment are substantially the same as those in the embodiment shown in FIG. 4.

Figure 12B:
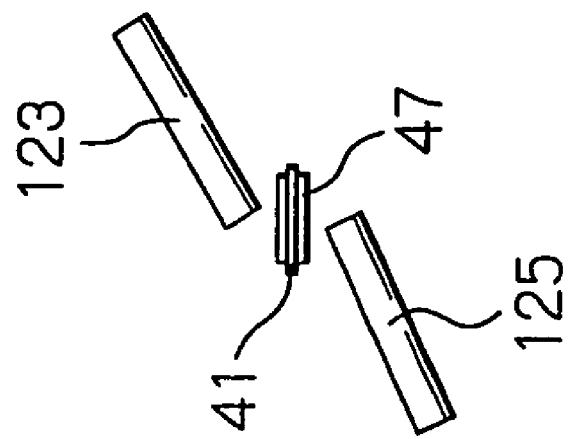
FIG. 12b is a side view for explaining the method of connecting probes and external connection pads in the embodiment of the present invention.
Figure 12A:
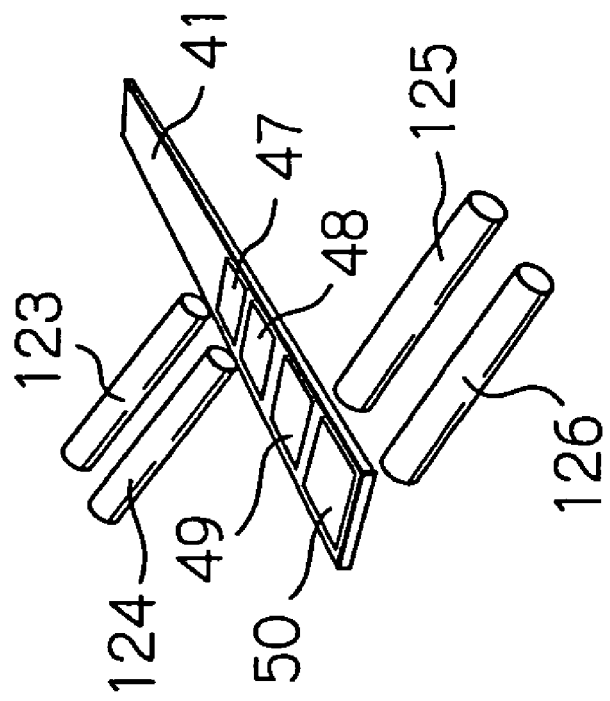
FIG. 12a is a perspective view for explaining a method of connecting probes and external connection pads in yet another embodiment of the present invention.

FIGS. 12a and 12b show a perspective view and a side view for explaining a method of connecting probes and external connection pads in yet another embodiment of the connection method of the present invention, respectively. Note that constitutions of an HGA and a dynamic characteristic measurement device connected thereto in this embodiment are the same as those in the embodiment shown in FIG. 4. Therefore, in FIGS. 12a and 12b, the same components as those in FIGS. 4 and 5 are denoted by the identical reference numerals.

In this embodiment, probe pins 123 and 124 and probe pins 125 and 126 are arranged on both sides of the wiring member 41 and are opposed to each other at an angle of 180° to be connected to the external connection pads 47 and 48 and the external connection pads 49 and 50, respectively. However, the directions of the probe pins are not directions perpendicular to the front surface of the wiring member 41 but considerably inclined directions. In other words, the probe pins 125 and 126 approach the external connection pads 49 and 50 from a direction of a predetermined angle considerably smaller than 90° with respect to the rear surface of the wiring member 41 of the HGA on the rear side thereof and come into contact with the external connection pads 49 and 50, respectively, to be electrically connected thereto, and the probe pins 123 and 124 approach the external connection pads 47 and 48 from a direction of a predetermined angle considerably smaller than 90° with respect to the front surface of the wiring member 41 on a front side thereof, which is a direction 180° apart from the direction of the probe pins 125 and 126, and come into contact with the external connection pads 47 and 48, respectively, to be electrically connected thereto. Note that, in FIGS. 12a and 12b, these probe pins and external connection pads are shown in a state in which they are not actually in contact with each other in order to facilitate explanation about approach directions of the probe pins with respect to the external connection pads.

As described above, in this embodiment, the probe pins 123 and 124, which are connected to the write magnetic head element, and the probe pins 125 and 126, which are connected to the read magnetic head element, approach the external connection pads 47 and 48 and the external connection pads 49 and 50, respectively, from the directions 180° apart from each other. In this way, the probe pins 123 and 124 on the write side and the probe pins 125 and 126 on the read side are connected to the external connection pads 47 and 48 and the external connection pads 49 and 50, respectively, at the approach angles 180° apart from each other, whereby cross talk can be reduced remarkably. Other components, operational effects, and the like in this embodiment are substantially the same as those in the embodiment shown in FIG. 4.

FIGS. 13a and 13b are a perspective view and a side view for explaining a method of connecting probes and external connection pads in yet another embodiment of the connection method of the present invention. Note that constitutions of an HGA and a dynamic characteristic measurement device connected thereto in this embodiment are the same as those in the embodiment shown in FIG. 4. Therefore, in FIGS. 13a and 13b, the same components as those in FIGS. 4 and 5 are denoted by the identical reference numerals.

In this embodiment, probe pins 133 and 134 and probe pins 135 and 136 are arranged on the same side of the wiring member 41 and connected to the external connection pads 47 and 48 and the external connection pads 49 and 50, respectively, at a predetermined angle smaller than 90° apart from each other. In other words, the probe pins 135 and 136 approach the external connection pads 49 and 50 from a direction perpendicular to the front surface of the wiring member 41 of the HGA and come into contact with the external connection pads 49 and 50, respectively, to be electrically connected thereto, and the probe pins 133 and 134 approach the external connection pads 47 and 48 from a direction of a predetermined angle slightly smaller than 90° with respect to the front surface of the wiring member 41 and come into contact with the external connection pads 47 and 48, respectively, to be electrically connected thereto. Note that, in FIGS. 13a and 13b, these probe pins and external connection pads are shown in a state in which they are not actually in contact with each other in order to facilitate explanation about approach directions of the probe pins with respect to the external connection pads.

As described above, in this embodiment, the probe pins 133 and 134, which are connected to the write magnetic head element, and the probe pins 135 and 136, which are connected to the read magnetic head element, approach the external connection pads 47 and 48 and the external connection pads 49 and 50, respectively, from the directions of a predetermined angle smaller than 90° apart from each other. In this way, the probe pins 133 and 134 on the write side and the probe pins 135 and 136 on the read side are connected to the external connection pads 47 and 48 and the external connection pads 49 and 50, respectively, at the different approach angles, whereby cross talk can be reduced remarkably. Other components, operational effects, and the like in this embodiment are substantially the same as those in the embodiment shown in FIG. 4.

Figure 14B:
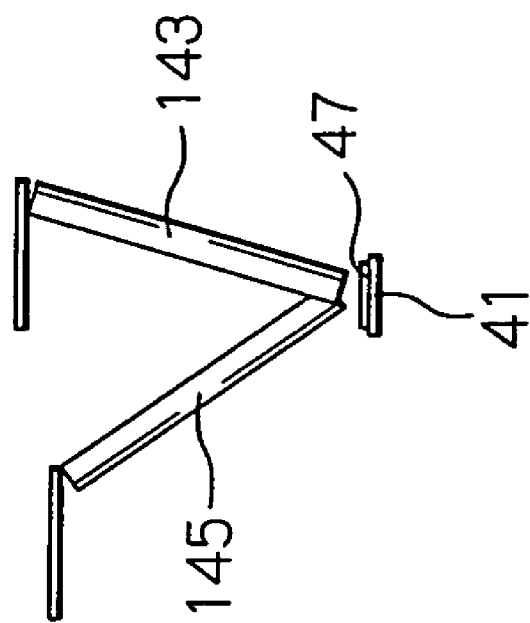
FIG. 14b is a side view for explaining the method of connecting probes and external connection pads in the embodiment of the present invention.
Figure 14A:
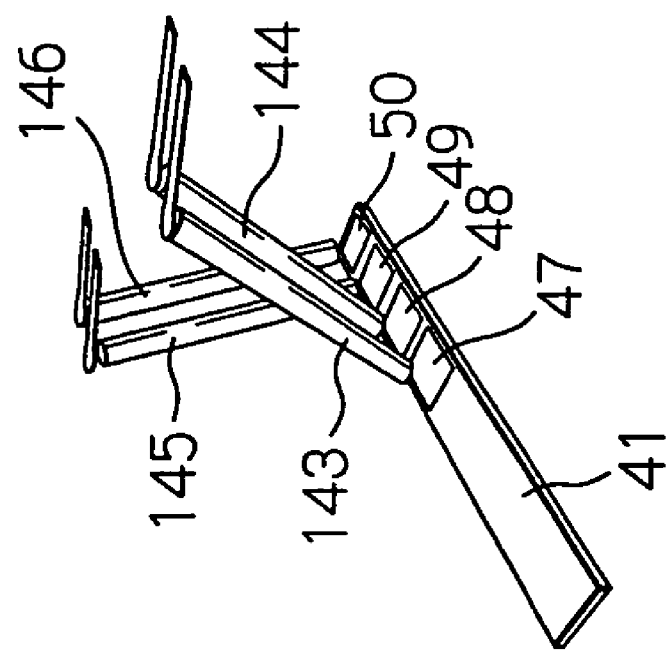
FIG. 14a is a perspective view for explaining a method of connecting probes and external connection pads in yet another embodiment of the present invention.

FIGS. 14a and 14b are a perspective view and a side view for explaining a method of connecting probes and external connection pads in yet another embodiment of the connection method of the present invention. Note that constitutions of an HGA and a dynamic characteristic measurement device connected thereto in this embodiment are the same as those in the embodiment shown in FIG. 4. Therefore, in FIGS. 14a and 14b, the same components as those in FIGS. 4 and 5 are denoted by the identical reference numerals.

In this embodiment, probe pins 143 and 144 and probe pins 145 and 146 are arranged on the same side of the wiring member 41 and connected to the external connection pads 47 and 48 and the external connection pads 49 and 50, respectively, at a predetermined angle smaller than 90° apart from each other. In other words, the probe pins 143 and 144 approach the external connection pads 47 and 48 from a direction of a predetermined angle slightly smaller than 90° with respect to the front surface of the wiring member 41 of the HGA and come into contact with the external connection pads 47 and 48, respectively, to be electrically connected thereto, and the probe pins 145 and 146 approach the external connection pads 49 and 50 from a direction of a predetermined angle slightly smaller than 90° with respect to the front surface of the wiring member 41 of the HGA, which is different from the angle of the probe pins 143 and 144, and come into contact with the external connection pads 49 and 50, respectively, to be electrically connected thereto. Note that, in FIGS. 14a and 14b, these probe pins and external connection pads are shown in a state in which they are not actually in contact with each other in order to facilitate explanation about approach directions of the probe pins with respect to the external connection pads.

As described above, in this embodiment, the probe pins 143 and 144, which are connected to the write magnetic head element, and the probe pins 145 and 146, which are connected to the read magnetic head element, approach the external connection pads 47 and 48 and the external connection pads 49 and 50, respectively, from the directions a predetermined angle smaller than 90° apart from each other. In this way, the probe pins 143 and 144 on the write side and the probe pins 145 and 146 on the read side are connected to the external connection pads 47 and 48 and the external connection pads 49 and 50, respectively, at the different approach angles, whereby cross talk can be reduced remarkably. Other components, operational effects, and the like in this embodiment are substantially the same as those in the embodiment shown in FIG. 4.

Figure 15B:
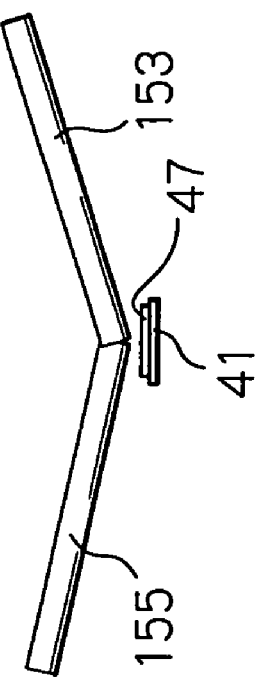
FIG. 15b is a side view for explaining the method of connecting probes and external connection pads in the embodiment of the present invention.
Figure 15A:
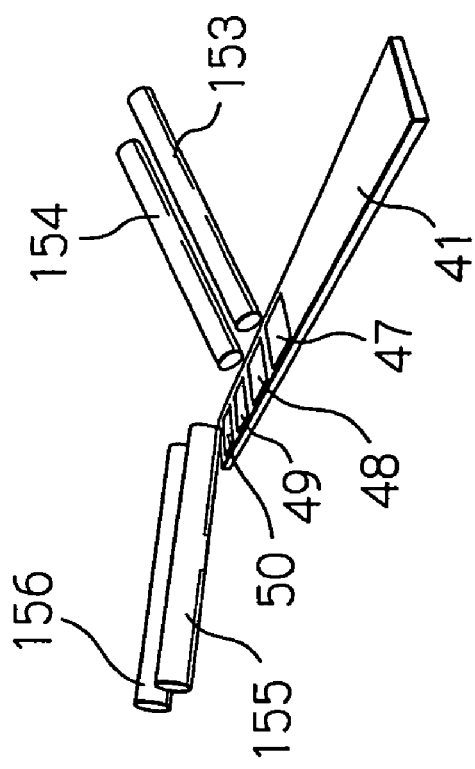
FIG. 15a is a perspective view for explaining a method of connecting probes and external connection pads in yet another embodiment of the present invention.

FIGS. 15a and 15b are a perspective view and a side view for explaining a method of connecting probes and external connection pads in yet another embodiment of the connection method of the present invention. Note that constitutions of an HGA and a dynamic characteristic measurement device connected thereto in this embodiment are the same as those in the embodiment shown in FIG. 4. Therefore, in FIGS. 15a and 15b, the same components as those in FIGS. 4 and 5 are denoted by the identical reference numerals.

In this embodiment, probe pins 153 and 154 and probe pins 155 and 156 are arranged on the same side of the wiring member 41 and connected to the external connection pads 47 and 48 and the external connection pads 49 and 50, respectively, a predetermined angle larger than 90° and smaller than 180° apart from each other. However, the directions of the probe pins are not directions perpendicular to the front surface of the wiring member but a considerably inclined direction. In other words, the probe pins 153 and 154 approach the external connection pads 47 and 48 from a significantly inclined direction of a predetermined angle nearly parallel to the surface of the wiring member 41 of the HGA and come into contact with the external connection pads 47 and 48, respectively, to be electrically connected thereto, and the probe pins 155 and 156 approach the external connection pads 49 and 50 from a considerably inclined direction of a predetermined angle nearly parallel to the surface of the wiring member 41, which is different from the direction of the probe pins 153 and 154, and come into contact with the external connection pads 49 and 50, respectively, to be electrically connected thereto. Note that, in FIGS. 15a and 15b, these probe pins and external connection pads are shown in a state in which they are not actually in contact with each other in order to facilitate explanation about approach directions of the probe pins with respect to the external connection pads.

As described above, in this embodiment, the probe pins 153 and 154, which are connected to the write magnetic head element, and the probe pins 155 and 156, which are connected to the read magnetic head element, approach the external connection pads 47 and 48 and the external connection pads 49 and 50, respectively, from the directions of the predetermined angle nearly 180° apart from each other. In this way, the probe pins 153 and 154 on the write side and the probe pins 155 and 156 on the read side are connected to the external connection pads 47 and 48 and the external connection pads 49 and 50, respectively, at the approach angles of the predetermined angle close to 180° apart from each other, whereby cross talk can be reduced remarkably. Other components, operational effects, and the like in this embodiment are substantially the same as those in the embodiment shown in FIG. 4.

FIGS. 16a and 16b show a perspective view and a side view for explaining a method of connecting probes and external connection pads in yet another embodiment of the connection method of the present invention, respectively. Note that constitutions of an HGA and a dynamic characteristic measurement device connected thereto in this embodiment are the same as those in the embodiment shown in FIG. 4. Therefore, in FIGS. 16a and 16b, the same components as those in FIGS. 4 and 5 are denoted by the identical reference numerals. Note that, in this embodiment, a shape of the wiring member 41' and an arrangement of external connection pads 47', 48', 49', and 50' formed on the wiring member 41' are different from those in the embodiments shown in FIGS. 10a and 10b to FIGS. 15a and 15b.

In this embodiment, probe pins 163 and 164 and probe pins 165 and 166 are arranged on both sides of the wiring member 41' and are opposed to each other at a predetermined angle smaller than 180° to be connected to the external connection pads 47' and 48' and the external connection pads 49' and 50', respectively. In other words, the probe pins 163 and 164 approach the external connection pads 47' and 48' from a direction perpendicular to a rear surface of the wiring member 41' of the HGA on a rear side thereof and come into contact with the external connection pads 47' and 48', respectively, to be electrically connected thereto, and the probe pins 165 and 166 approach the external connection pads 49' and 50' from a direction of a predetermined angle smaller than 90° with respect to a front surface of the wiring member 41' on a front side thereof and come into contact with the external connection pads 49' and 50', respectively, to be electrically connected thereto. Note that, in FIGS. 16a and 16b, these probe pins and external connection pads are shown in a state in which they are not actually in contact with each other in order to facilitate explanation about approach directions of the probe pins with respect to the external connection pads.

As described above, in this embodiment, the probe pins 163 and 164, which are connected to the write magnetic head element, and the probe pins 165 and 166, which are connected to the read magnetic head element, approach the external connection pads 47' and 48' and the external connection pads 49' and 50', respectively, from the directions of the predetermined angle smaller than 180° apart from each other. In this way, the probe pins 163 and 164 on the write side and the probe pins 165 and 166 on the read side are connected to the external connection pads 47' and 48' and the external connection pads 49' and 50', respectively, at the approach angles of the predetermined angle smaller than 180° apart from each other, whereby cross talk can be reduced remarkably. Other components, operational effects, and the like in this embodiment are substantially the same as those in the embodiment shown in FIG. 4.

FIGS. 17a and 17b show a perspective view and a side view for explaining a method of connecting probes and external connection pads in yet another embodiment of the connection method of the present invention, respectively. Note that constitutions of an HGA and a dynamic characteristic measurement device connected thereto in this embodiment are the same as those in the embodiment shown in FIG. 4. Therefore, in FIGS. 17a and 17b, the same components as those in FIGS. 4 and 5 are denoted by the identical reference numerals. Note that, in this embodiment, a shape of the wiring member 41' and an arrangement of external connection pads 47', 48', 49', and 50' formed on the wiring member 41' are different from those in the embodiments shown in FIGS. 10a and 10b to FIGS. 15a and 15b.

In this embodiment, probe pins 173 and 174 and probe pins 175 and 176 are arranged on the same side of the wiring member 41' and connected to the external connection pads 47' and 48' and the external connection pads 49' and 50', respectively, of a predetermined angle smaller than 90° apart from each other. In other words, the probe pins 175 and 176 approach the external connection pads 49' and 50' from a direction perpendicular to the front surface of the wiring member 41' of the HGA and come into contact with the external connection pads 49' and 50', respectively, to be electrically connected thereto, and the probe pins 173 and 174 approach the external connection pads 47' and 48' from a direction of a predetermined angle slightly smaller than 90° with respect to the front surface of the wiring member 41' and come into contact with the external connection pads 47' and 48', respectively, to be electrically connected thereto. Note that, in FIGS. 17a and 17b, these probe pins and external connection pads are shown in a state in which they are not actually in contact with each other in order to facilitate explanation about approach directions of the probe pins with respect to the external connection pads.

As described above, in this embodiment, the probe pins 173 and 174, which are connected to the write magnetic head element, and the probe pins 175 and 176, which are connected to the read magnetic head element, approach the external connection pads 47' and 48' and the external connection pads 49' and 50', respectively, from the directions of the predetermined angle smaller than 90° apart from each other. In this way, the probe pins 173 and 174 on the write side and the probe pins 175 and 176 on the read side are connected to the external connection pads 47' and 48' and the external connection pads 49' and 50', respectively, at the different approach angles, whereby cross talk can be reduced. Other components, operational effects, and the like in this embodiment are substantially the same as those in the embodiment shown in FIG. 4.

FIGS. 18a and 18b show a perspective view and a side view for explaining a method of connecting probes and external connection pads in yet another embodiment of the connection method of the present invention, respectively. Note that constitutions of an HGA and a dynamic characteristic measurement device connected thereto in this embodiment are the same as those in the embodiment shown in FIG. 4. Therefore, in FIGS. 18a and 18b, the same components as those in FIGS. 4 and 5 are denoted by the identical reference numerals. Note that, in this embodiment, a shape of the wiring member 41' and an arrangement of external connection pads 47', 48', 49', and 50' formed on the wiring member 41' are different from those in the embodiments shown in FIGS. 10a and 10b to FIGS. 15a and 15b.

In this embodiment, probe pins 183 and 184 and probe pins 185 and 186 are arranged on the same side of the wiring member 41' and connected to the external connection pads 47' and 48' and the external connection pads 49' and 50', respectively, at a predetermined angle smaller than 90° apart from each other. In other words, the probe pins 183 and 184 approach the external connection pads 47' and 48' from a direction of a predetermined angle slightly smaller than 90° with respect to the front surface of the wiring member 41' of the HGA and come into contact with the external connection pads 47' and 48', respectively, to be electrically connected thereto, and the probe pins 185 and 186 approach the external connection pads 49' and 50' from a direction of a predetermined angle slightly smaller than 90° with respect to the front surface of the wiring member 41', which is a direction different from the direction of the probe pins 183 and 184, and come into contact with the external connection pads 49' and 50', respectively, to be electrically connected thereto. Note that, in FIGS. 18a and 18b, these probe pins and external connection pads are shown in a state in which they are not actually in contact with each other in order to facilitate explanation about approach directions of the probe pins with respect to the external connection pads.

As described above, in this embodiment, the probe pins 183 and 184, which are connected to the write magnetic head element, and the probe pins 185 and 186, which are connected to the read magnetic head element, approach the external connection pads 47' and 48' and the external connection pads 49' and 50', respectively, from the directions of the predetermined angle smaller than 90° apart from each other. In this way, the probe pins 183 and 184 on the write side and the probe pins 185 and 186 on the read side are connected to the external connection pads 47' and 48' and the external connection pads 49' and 50', respectively, at the different approach angles, whereby cross talk can be reduced. Other components, operational effects, and the like in this embodiment are substantially the same as those in the embodiment shown in FIG. 4.

Note that, as a method of connecting probe pins and external connection pads of a wiring member, various forms are conceivable other than the above-described embodiments. In short, it is possible to reduce cross talk as long as an approach direction of probe pins, which are connected to external connection pads for a write head element, and an approach direction of probe pins, which are connected to external connection pads for a read head element, are not parallel with and different from each other. In addition, it is needless to mention that a structure of an HGA is not limited to the above-mentioned structures and various other structures are applicable.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method of connecting a plurality of probe pins for measurement of characteristics of a thin-film magnetic head, to a plurality of first external connection pads, which are provided on a head gimbal assembly and are electrically connected to a plurality of terminal electrodes of a write magnetic head element, respectively, and to a plurality of second external connection pads, which are provided on the head gimbal assembly and are electrically connected to a plurality of terminal electrodes of a read magnetic head element, wherein an approach direction of said probe pins to said first external connection pads and an approach direction of said probe pins to said second external connection pads are made different from each other, wherein the approach directions are different from each other by a predetermined angle, which is larger than 90° and smaller than 180°.

2. The connection method as claimed in claim 1, wherein said probe pins are connected to said first and second external connection pads, which exist on an identical surface of said head gimbal assembly.

3. The connection method as claimed in claim 1, wherein said probe pins are connected to said first and second external connection pads, which exist on different surfaces of said head gimbal assembly, respectively.

4. The connection method as claimed in claim 1, wherein said probe pins are four probe pins which are connected to two of said first external connection pads and two of said second external connection pads, respectively.

5. A method of measuring characteristics of a thin-film magnetic head which uses a connection method for probe pins for measurement of characteristics of a thin-film magnetic head, the connection method connecting a plurality of probe pins, to a plurality of first external connection pads, which are provided on a head gimbal assembly and are electrically connected to a plurality of terminal electrodes of a read magnetic head element, respectively, and to a plurality of second external connection pads, which are provided on the head gimbal assembly and are electrically connected to a plurality of terminal electrodes of a read magnetic head element, wherein an approach direction of said probe pins to said first external connection pads and an approach direction of said probe pins to said second external connection pads are made different from each other, to thereby perform characteristic measurement for said write magnetic head element and/or said read magnetic head element according to this connection method, wherein the approach directions are different from each other by a predetermined angle, which is larger than 90° and smaller than 180°.

6. The characteristic measurement method as claimed in claim 5, wherein said probe pins are connected to said first and second external connection pads, which exist on an identical surface of said head gimbal assembly.

7. The characteristic measurement method as claimed in claim 5, wherein said probe pins are connected to said first and second external connection pads, which exist on different surfaces of said head gimbal assembly, respectively.

8. The characteristic measurement method as claimed in claim 5, wherein said probe pins are four probe pins which are connected to two of said first external connection pads and two of said second external connection pads, respectively.

* * * * *